US008504983B1

(12) United States Patent
Englehart et al.

(10) Patent No.: US 8,504,983 B1
(45) Date of Patent: *Aug. 6, 2013

(54) SYSTEM AND METHOD FOR GENERATING SOURCE CODE FROM A GRAPHICAL MODEL

(75) Inventors: Matthew Englehart, Olmsted Township, OH (US); Peter Szpak, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 843 days.

This patent is subject to a terminal disclaimer.

(21) Appl. No.: 12/706,572

(22) Filed: Feb. 16, 2010

Related U.S. Application Data

(63) Continuation of application No. 10/698,820, filed on Oct. 31, 2003, now Pat. No. 7,689,970.

(51) Int. Cl.
*G06F 9/44* (2006.01)
(52) U.S. Cl.
USPC ............ 717/109; 717/105; 717/106; 717/113
(58) Field of Classification Search
USPC ................................................. 717/104–113
See application file for complete search history.

(56) References Cited

U.S. PATENT DOCUMENTS

| 5,187,788 A | 2/1993 | Marmelstein |
| 5,892,510 A | 4/1999 | Lau et al. |
| 5,966,532 A | 10/1999 | McDonald et al. |
| 6,053,951 A * | 4/2000 | McDonald et al. ........... 717/109 |
| 6,066,181 A | 5/2000 | DeMaster |
| 6,421,822 B1 | 7/2002 | Pavela |
| 6,684,385 B1 | 1/2004 | Bailey et al. |
| 6,701,513 B1 * | 3/2004 | Bailey ........................... 717/109 |
| 7,231,631 B1 | 6/2007 | Branch Freeman et al. |
| 7,367,012 B2 | 4/2008 | Szpak et al. |
| 2002/0010908 A1 | 1/2002 | Cheng et al. |
| 2003/0056195 A1 | 3/2003 | Hunt |
| 2003/0074235 A1 | 4/2003 | Gregory |
| 2003/0225774 A1 | 12/2003 | Davidov et al. |
| 2004/0085357 A1 | 5/2004 | Childress et al. |
| 2004/0111696 A1 | 6/2004 | Soroker et al. |
| 2004/0230945 A1 | 11/2004 | Bryant et al. |
| 2004/0255269 A1 | 12/2004 | Santori et al. |

OTHER PUBLICATIONS

"Using Simulink, Version 4," 1990-2001, The MathWorks, Inc.*
Englehart, Matthew, "ACSL Code: A High Quality Code Generator for Control Applications," Proceedings of the 1996 IEEE International Symposium on Computer-Aided Control System Design, pp. 477-482 (1996).

(Continued)

*Primary Examiner* — Qing Chen
(74) *Attorney, Agent, or Firm* — Nelson Mullins Riley & Scarborough LLP

(57) ABSTRACT

A graphical user interface that enables a user to create and specify the properties of custom storage classes is disclosed. The characteristics of each storage class are specified via parameter settings accessible from the graphical interface. Each custom storage class designed through the interface is defined by a combination of parameter settings. A code preview window in the graphical interface displays salient aspects of the source code references to model data given the selected parameter settings. The display is shown dynamically and adjusted to reflect subsequent changes in parameter settings.

30 Claims, 4 Drawing Sheets

(56) References Cited

OTHER PUBLICATIONS

Englehart, Matt et al., "ControlH: A Fourth Generation Language for Real-Time GN&C Applications," Proceedings of the IEEE/IFAC Joint Symposium on Computer-Aided Control System Design, pp. 261-270 (1994).

Englehart, Matt et al., "ControlH: An Algorithm Specification Language and Code Generator," IEEE Control Systems, vol. 15(2):54-64 (1995).

Englehart, Matthew, "High Quality Automatic Code Generation for Control Applications," Proceedings of the IEEE/IFAC Joint Symposium on Computer-Aided Control System Design, pp. 363-367 (1994).

Langworthy, David E. et al., "Storage Class Extensibility in the Brown Object Storage System," Brown University, Technical Report: CS-94-22, pp. 1-23 (1994).

The MathWorks, Inc., "Real-Time Workshopa for Use with Simulink, A User's Guide, Version 3," (1999).

* cited by examiner

SYSTEM AND METHOD FOR GENERATING SOURCE CODE FROM A GRAPHICAL MODEL

RELATED APPLICATIONS

The present application is a continuation of U.S. application Ser. No. 10/698,820, entitled "System and Method for Generating Source Code from a Graphical Model," filed Oct. 31, 2003, which is related to a United States Patent Application entitled "Generating Code For Data References", U.S. patent application Ser. No. 09/876, 487, the contents of which are hereby incorporated by reference.

FIELD OF THE INVENTION

The illustrative embodiment of the present invention relates generally to the use of custom storage classes in a graphical model, and more specifically to the use of a graphical user interface to select parameters for custom storage classes used in the automatic generation of source code from a graphical model and the display of that generated code.

BACKGROUND

Automatic code generation is a process whereby software source code is automatically produced from a graphical model. The software source code produced by the automatic code generation process may be compiled and then executed on a digital computer or other electronic device implementing the functionality specified by the model. The graphical model being studied may contain many different types of data references. Data may be used to represent the states of the system, as well as the flow of matter, energy, or information between system components. Each item of data in the model is defined to have a data storage class. Data is in turn represented in the generated software source code in a manner that is prescribed by its storage class. The software source code references data in a number of different ways including defining data, declaring data, initializing data, reading a value of data, assigning the value of data, and the choice of storage class controls how each of these references are generated.

Code generators may provide predefined sets of storage classes, and they may also permit the user to define new, custom storage classes with user-defined characteristics. The custom storage class provides a central point for software code generation of a set of objects since changes to the unique set of instructions defining a custom storage class collectively apply to the (potentially large) set of data of that class. Common software engineering practices that may be enabled with custom storage classes include embedding a data item in a bit field, embedding a data item in a structure, embedding a data item in a union, using platform-specific declarations in the data declaration, defining the scope and storage of the data, declaring data using arbitrary C types, and accessing data through function calls.

Unfortunately, it is often difficult to create a custom storage class. Conventional methods of creating custom storage classes for use with an automatic code generator require the use of programmatic callbacks that interface to the lower levels of the code generator architecture. The writing of the programmatic callbacks requires an in-depth knowledge of the workings of the automatic code generator. The required level of knowledge regarding the automatic code generator is often lacking for many users as is the desire to write the programmatic callbacks.

BRIEF SUMMARY OF THE INVENTION

The illustrative embodiment of the present invention provides a graphical user interface that enables a user to create and specify the properties of custom storage classes. The characteristics of each storage class are specified via parameter settings accessible from the graphical interface. Each custom storage class designed through the interface is defined by a combination of parameter settings. A code preview window in the graphical interface displays the source code references to model data given the selected parameter settings. The display is shown dynamically and adjusted to reflect subsequent changes in parameter settings.

In one embodiment, in an electronic device with a graphical modeling and execution environment that includes at least one graphical model, a method provides a user interface which has different user-selectable parameter settings for a custom storage class. The custom storage class specifies the manner in which an automatic code generator creates source code for data referenced by a graphical model. Following the selection of parameters through the interface, a custom storage class is created using the selected parameters.

In another embodiment, in an electronic device having a modeling and execution environment that includes at least one graphical model, a system includes a user interface with different selectable parameter settings for a custom storage class. The custom storage class specifies the manner in which an automatic code generator creates source code from the model. The system also includes a custom storage class created utilizing parameters selected by a user from the user interface and a view of code generated by the automatic code generator utilizing the user-selected parameters.

DETAILED DESCRIPTION

The illustrative embodiment of the present invention provides a user interface displaying user-selectable parameter settings to be used in the creation of a custom storage class. The custom storage class is utilized by an automatic code generator in a modeling and execution environment to create source code referencing data from a graphical model. Salient aspects of the generated source code are displayed to the user in a code view area of the user interface. Subsequent alterations in the user-selected parameters cause a regeneration of the displayed source code and an update of the display of this new code to the user.

Figure 1:
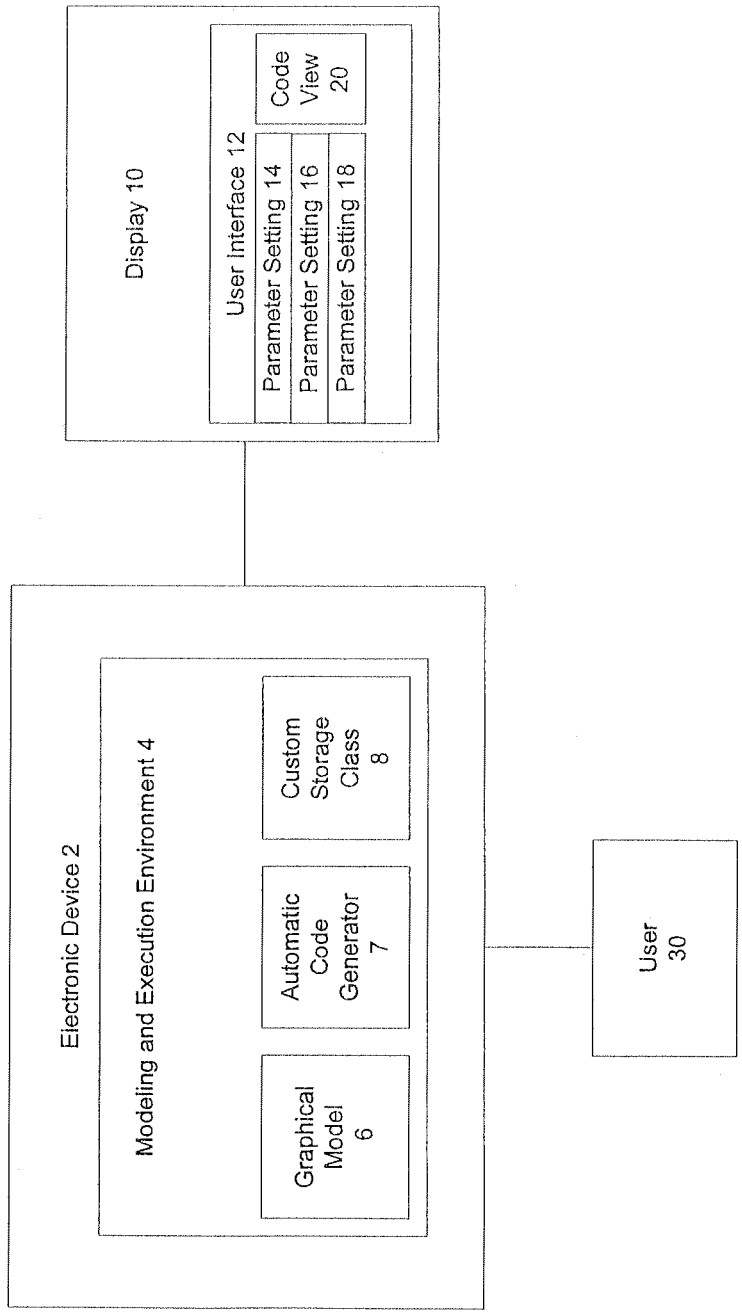
FIG. 1 depicts an environment suitable for practicing the illustrative embodiment of the present invention.

FIG. 1 depicts an environment suitable for practicing the illustrative embodiment of the present invention. An electronic device 2 includes a modeling and execution environment 4. The electronic device 2 may be a server, client, workstation, laptop, PDA or other electronic device equipped with a processor. The modeling and execution environment, such as Simulink™ from The Mathworks, Inc. of Natick, Mass., includes at least one graphical model 6 of a software diagram, such as a model of a dynamic system being modeled with a block diagram or a data flow diagram or other type of graphical program such as a Unified Modeling Language diagram. The modeling and execution environment 4 also includes an automatic code generator 7 used to programmatically generate source code referencing data of the graphical model 6. The graphical model 6 may graphically depict time-dependent mathematical relationships among the system's inputs, states and outputs. The graphical model 6 is an executable specification that can be translated to target ready code for a particular platform. Platforms may include CPUs, real-time operating systems, custom Application Specific Integrated Circuits (ASICs), and hardware Field Programmable Gate Arrays (FPGAs). The data referred to may encompass many different types of data. For example, in a block diagram, the source code may reference signal objects and the signal line values from signal lines connecting blocks in a block diagram. Alternatively, the source code may reference block objects and block values and functionality of a block from the block diagram.

The electronic device 2 is interfaced with a display 10. The display 10 includes a user interface 12 generated by the modeling and execution environment 4. The user interface 12, which is accessible by a user 30 through an input device such as a mouse, includes user-selectable parameter settings 14, 16 and 18. The user selectable parameter settings 14, 16 and 18 are parameters for use in the creation of a custom storage class 8 and are discussed in more detail below. The user-selectable parameter settings 14, 16 and 18 may be represented on the user interface 12 in a number of ways including through the use of conventional user interface controls such as radio buttons, check boxes or text boxes able to accept textual input specifying a parameter value. The user-selectable parameters are utilized by the automatic code generator 7 to create a custom storage class. The custom storage class is then utilized by the automatic code generator the create source code referencing data for the graphical model 6. The user interface 12 also includes a code view area 20 where the automatic code generator 7 may display salient aspect of the source code created from the use of the custom storage class.

Those skilled in the art will recognize that the environment depicted in FIG. 1 is just one of many environments falling within the scope of the present invention. For example, the various components depicted in FIG. 1 may be dispersed over a distributed network. Thus the user 30 and the display 10 may be located remotely from a server holding the modeling and execution environment 4. Similarly the graphical model 6 and the created custom storage class 8 may be located remotely from the modeling and execution environment 4 over a network. It will be appreciated that many other configurations are also possible within the scope of the present invention.

The graphical model 6 may be a block diagram model. A block diagram model includes a set of symbols, called blocks, interconnected by signal lines that carry signals. Blocks are functional entities that operate on signal values contained in the signal lines. Each block can have zero or more input signal lines and zero or more output signal lines. Blocks may also have states. A state is a variable that determines a block's output and whose current value is a function of the previous values of the block's states and/or inputs. In a block diagram model, the signals carried on the signal lines are the streams of values that appear at the output ports of blocks. The signal can have a wide range of attributes, such as name, data type (e.g., 8-bit, 16-bit or 32-bit integer), numeric type (e.g., real or complex), and dimensionality (e.g., one-dimension array, two-dimension array or multi-dimensional array).

Each item of data in the graphical model 6 is defined to have a data storage class. A data storage class contains the instructions that define how the automatic code generator 7 is to produce code when a reference to an item of data belonging to that data storage class is encountered in the model. Data storage classes may be either pre-defined or custom. Pre-defined data storage classes represent those data storage classes inherent within a modeling system. Pre-defined data storage classes are not capable of modification by a user and represent an instruction or set of instructions for each type of reference to the data. It should be appreciated that although the examples contained herein are made with reference to block diagram models, the illustrative embodiment of the present invention may also be applied to other types of diagrams besides block diagrams.

Custom data storage classes are not inherent to the modeling system and are generated by an interpreted programming language process. Using the interpreted programming language process, the user specifies a custom data storage class by specifying a set of instructions for each type of reference to the data. This set defines the data storage class. Specifically, the custom data storage class is characterized by the set of instructions defined by the user via parameter settings that detail how to generate software source code for each type of reference to data that is of that class. The parameter settings for the custom class are chosen by the user via the user interface 12. The user may then specify that custom data storage class as the item's storage class. Because the user specifies and defines these instructions, the possible variations in the software source code to be generated are extensive. The instructions corresponding to a given custom data storage class may be a function of the set of items that are defined to be of that class, so that the mechanism is self-referential.

Once the graphical model 6 is specified, an automatic code generator 7 examines each data item specified in the graphical model 6 and determines the storage class of the data item. If the data storage class is predefined, the automatic code generator 7 applies a fixed set of instructions to generate code for each type of reference to the item. If the data storage class is determined to be a custom storage class 8, the automatic code generator 7 accesses an external set of user-defined instructions associated with the custom data storage class through an application programming interface (API) to generate code for each type of reference to the item.

An implementation of the code generation process can be seen in Real-Time Workshop™ from The MathWorks, Inc. of Natick, Mass. Real-Time Workshop™ is a set of tools that generate code from Simulink™ models for targeted systems. Simulink™ translates the graphical model 6 into a Real-Time Workshop ".rtw" file. Simulink™ is a software package for modeling, simulating, and analyzing dynamic systems. Simulink™ supports linear and nonlinear systems, modeled in continuous time, sampled time, or a hybrid of the two. Systems can also be multi-rate, i.e., have different parts that are sampled or updated at different rates. Real-Time Workshop takes the .rtw file and pre-defined data storage classes supplied by The MathWorks, Inc., to produce C programming language code corresponding to the graphical model 6. During the code generation process, tokens in the pre-defined storage class files are replaced with strings defined in the .rtw file. Customized code generation occurs when Real-Time Workshop™ encounters a data record in the .rtw file that instructs it to utilize a custom data storage class instead of the predefined data storage class to generate code corresponding to a reference to data. More specifically, when an item of data is defined to have a custom data storage class, instructions associated with that data storage class are used to generate code corresponding to the data, at each point in the code generation process where the data is referenced.

Figure 2:
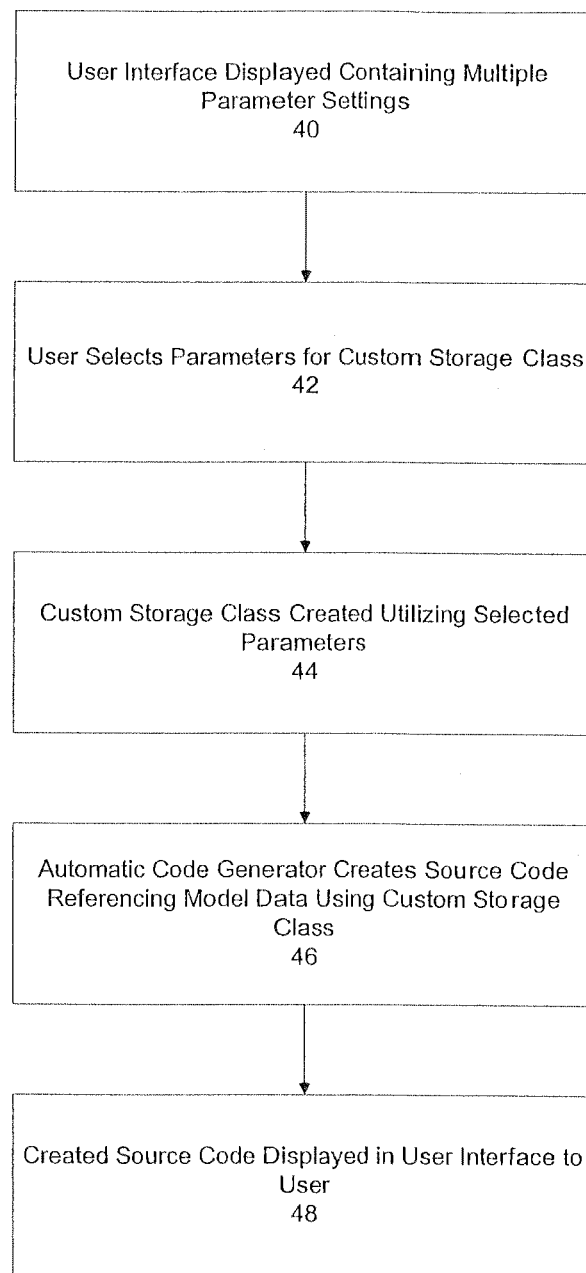
FIG. 2 is a flowchart of the sequence of steps followed by the illustrative embodiment of the present invention to create and display source code referencing model data.

As noted above, the illustrative embodiment of the present invention enables a user to customize the way source code is generated for a model by adjusting parameter settings through a user interface. FIG. 2 depicts the sequence of steps followed by the illustrative embodiment of the present invention to create and display source code referencing model data. The sequence begins when the user interface 12 is displayed containing multiple parameter settings 14, 16 and 18 (step 40). The user 40 selects parameters for the custom storage class (step 42). The custom storage class is created by utilizing the selected parameter settings 14, 16 and 18 (step 44). The automatic code generator 7 creates source code referencing the data of the graphical model 6 using the settings embodied in the custom storage class (step 46). The created source code is then displayed in the user interface 12 to the user 30 (step 48). The displayed source code may include tokens or regular expressions representative of actual code segments.

Figure 3:
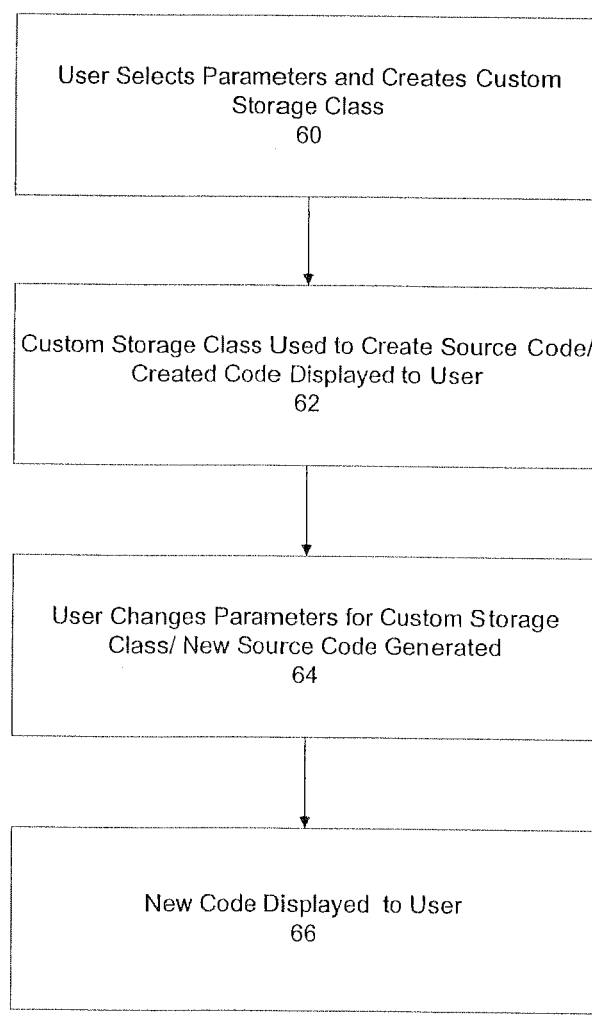
FIG. 3 is a flowchart of the sequence of steps followed by the illustrative embodiment of the present invention to adjust and re-display source code generated following a change in the selected parameters for a custom storage class.

The initial generation of code responsive to the parameter settings may not always result in a desired outcome for the user. The illustrative embodiment of the present invention allows the process to iterate with a real time display of adjusted code reflective of each code recalculation. FIG. 3 is a flowchart of the sequence of steps followed by the illustrative embodiment of the present invention to adjust and re-display source code generated following a change in the selected parameters for a custom storage class. The sequence begins when the user selects parameters in the user interface 12 and the custom storage class is created (step 60). The custom storage class is then used to create source code referencing model data, and the source code is displayed to the user 30 in the code view 20 portion of the user interface 12 (step 62). Subsequently, the user 30 may change parameter settings and the process creates new source code (step 64). The new source code based on the adjusted parameter settings is then displayed to the user 30 (step 66).

Figure 4:
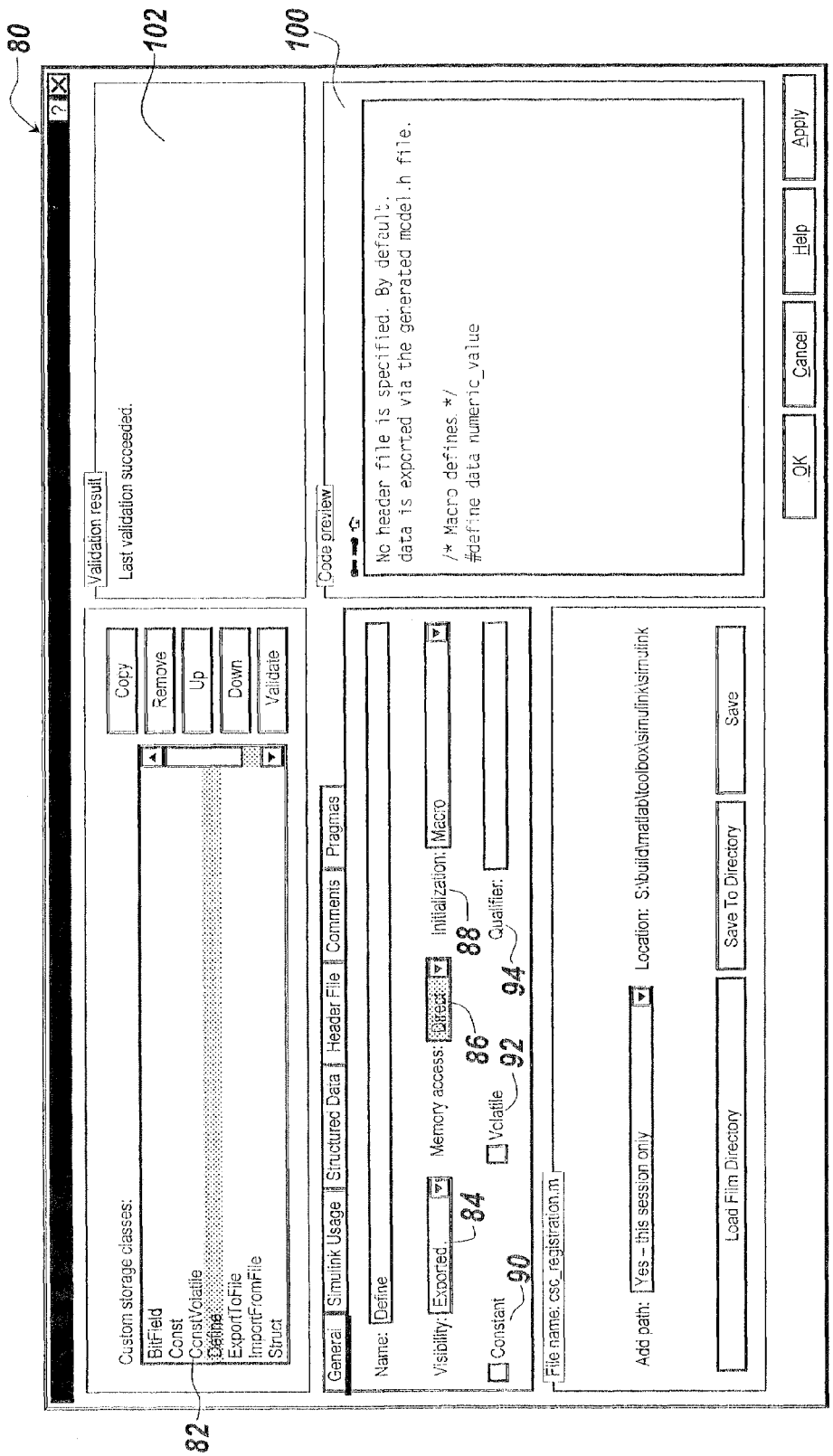
FIG. 4 depicts a view of the user interface of the illustrative embodiment of the present invention.

FIG. 4 depicts a view 80 of the user interface 12 of the illustrative embodiment of the present invention. The view 80 includes a listing of different types of user selectable custom storage classes 82 (BitField, Const, ConstVolatile, Define, ExportToFile, ImportFromFile, Struct). Each type of custom storage class has multiple user-selectable parameter settings. For example the view 80 displays the general parameter settings for the Define storage class including a visibility parameter setting 84, a memory access setting 86, an initialization parameter setting 88, a constant parameter setting 90, a volatile parameter setting 92 and a qualifier parameter setting 94. Those skilled in the art will notice that the parameter settings displayed on the user interface include pull down menus 84, 86 and 88, check boxes 90 and 92 and text boxes 94 through which a user may specify parameter settings. The view 80 also includes a validation result area 102 and a code preview area 100. The validation result displays the result of a check to make sure selected parameter setting may be implemented without the automatic code generator 7. For example, some parameter settings may conflict and prevent code generation. The code preview area is the area of the user interface where the automatic code generator displays generated source code and symbolic representations of source code.

Those skilled in the art will recognize that other additional parameter settings may also be adjusted through the user interface 12. Header file information may be specified, as may certain details of Simulink™ usage (e.g. the user may specify whether parameter or signal objects will utilize the custom storage class). Various other settings specific to particular custom storage classes may also be specified (e.g. struct data settings for the Struct custom storage class). Certain non-portable directives to a compiler referred to as "pragmas", such as near and far qualifiers may also be specified via the user interface 12. It will be appreciated that additional custom storage classes may also be created and displayed via the user interface 12 in order for a user to adjust parameter settings for the code generation process.

Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequences of steps discussed herein are examples and not the exclusive sequence of steps possible within the scope of the present invention.

We claim:

1. A method for generating source code from at least one graphical model in a graphical modeling and execution environment executing on a computing device, the method comprising:
    defining a custom data storage class in the graphical modeling and execution environment, wherein the defining includes:
        receiving a user-specification of parameter values for a plurality of pre-defined parameters, and
        specifying a manner for generating source code using an automatic code generator, wherein the automatic code generator generates source code that implements functionality of the at least one graphical model and that corresponds to data referenced by the at least one graphical model; and
    generating source code corresponding to the data referenced by the at least one graphical model, wherein the generating comprises:
        using the custom data storage class to generate the source code corresponding to the data referenced by the at least one graphical model;
        changing at least one user-specified parameter value for the custom data storage class; and
        adjusting the source code generated by the automatic code generator to reflect the change in the at least one user-specified parameter value.

2. The method of claim 1, further comprising:
    providing a view of salient aspects of the source code generated by the automatic code generator utilizing user-specified parameter values.

3. The method of claim 2, wherein the view of salient aspects of the source code generated includes at least one token, wherein the at least one token is symbolically representative of a non-displayed segment of the source code.

4. The method of claim 2, further comprising:
    displaying salient aspects of the adjusted source code in the view of salient aspects of the source code.

5. The method of claim 2, wherein the providing the view of salient aspects of the source code includes:
    displaying the salient aspects proximate to parts of the at least one graphical model, wherein the parts of the at least one graphical model are related to the salient aspects.

6. The method of claim 5, wherein the parts of the at least one graphical model include blocks or signal lines.

7. The method of claim 1, wherein the custom data storage class declares macros for instances of constant data.

8. The method of claim 1, wherein the custom data storage class declares variables for instances of constant data.

9. The method of claim 1, wherein the at least one user-specified parameter value is for a parameter that controls at least one of a manner in which automatically generated source code is defined, declared, accessed, and addressed.

10. The method of claim 1, wherein the at least one user-specified parameter value is for a parameter that includes a non-portable directive to a compiler.

11. The method of claim 10, wherein the non-portable directive to a compiler assigns data to at least one memory location in the computing device.

12. The method of claim 1, wherein the automatic code generator accesses an external set of user-defined instructions associated with the custom data storage class through an application programming interface (API) to generate source code for each type of reference to a data item in the at least one graphical model.

13. The method of claim 1, further comprising:
creating a separate header file with the automatic code generator in response to the user-specification of a parameter value for at least one of the plurality of pre-defined parameters.

14. The method of claim 1, further comprising:
validating the at least one user-specified parameter value.

15. The method of claim 1, wherein the source code includes salient aspects.

16. The method of claim 15, wherein the salient aspects include one or more of an identifier, code metrics, memory information, data type information, and variable information.

17. A non-transitory computer-readable medium for use in a computing device executing a graphical modeling and execution environment, wherein the graphical modeling and execution environment includes at least one graphical model, and wherein the non-transitory computer-readable medium stores computer-executable instructions that, when executed, cause the computing device to:
define a custom data storage class in the graphical modeling and execution environment, wherein the defining includes:
receiving a user-specification of parameter values for a plurality of pre-defined parameters, and
specifying a manner for generating source code using an automatic code generator, wherein the automatic code generator generates source code that implements functionality of the at least one graphical model and that corresponds to data referenced by the at least one graphical model; and
generate source code corresponding to the data referenced by the at least one graphical model, wherein the generating comprises:
using the custom data storage class to generate the source code corresponding to the data referenced by the at least one graphical model;
changing at least one user-specified parameter value for the custom data storage class; and
adjusting the source code generated by the automatic code generator to reflect the change in the at least one user-specified parameter value.

18. The non-transitory computer-readable medium of claim 17, wherein the computer-executable instructions, when executed, further cause the computing device to:
provide a view of salient aspects of the source code generated by the automatic code generator utilizing user-specified parameter values.

19. The non-transitory computer-readable medium of claim 18, wherein the view of salient aspects of the source code generated includes at least one token, wherein the at least one token is symbolically representative of a non-displayed segment of the source code.

20. The non-transitory computer-readable medium of claim 18, wherein the computer-executable instructions, when executed, further cause the computing device to:
display salient aspects of the adjusted source code in the view of salient aspects of the source code.

21. The non-transitory computer-readable medium of claim 17, wherein the custom data storage class declares macros for instances of constant data.

22. The non-transitory computer-readable medium of claim 17, wherein the custom data storage class declares variables for instances of constant data.

23. The non-transitory computer-readable medium of claim 17, wherein the at least one user-specified parameter value is for a parameter that controls at least one of a manner in which automatically generated source code is defined, declared, accessed, and addressed.

24. The non-transitory computer-readable medium of claim 17, wherein the at least one user-specified parameter value is for a parameter that includes a non-portable directive to a compiler.

25. The non-transitory computer-readable medium of claim 24, wherein the non-portable directive to a compiler assigns data to at least one memory location in the computing device.

26. The non-transitory computer-readable medium of claim 17, wherein the automatic code generator accesses an external set of user-defined instructions associated with the custom data storage class through an application programming interface (API) to generate source code for each type of reference to a data item in the at least one graphical model.

27. The non-transitory computer-readable medium of claim 17, wherein the computer-executable instructions, when executed, further cause the computing device to:
create a separate header file with the automatic code generator in response to the user-specification of a parameter value for at least one of the plurality of pre-defined parameters.

28. An electronic device having a modeling and execution environment with at least one graphical model, the electronic device comprising:
a processor configured to:
define a custom data storage class in the graphical modeling and execution environment, wherein the defining includes:
receiving a user-specification of parameter values for a plurality of pre-defined parameters, and
specifying a manner for generating source code using an automatic code generator, wherein the automatic code generator generates source code that implements functionality of the at least one graphical model and that corresponds to data referenced by the at least one graphical model; and
generate source code corresponding to the data referenced by the at least one graphical model, wherein the generating comprises:
using the custom data storage class to generate the source code corresponding to the data referenced by the at least one graphical model;

changing at least one user-specified parameter value for the custom data storage class; and adjusting the source code generated by the automatic code generator to reflect the change in the at least one user-specified parameter value; and a storage device configured to:

store the generated source code or the adjusted source code.

29. The electronic device of claim 28, further comprising:

a display device configured to display a view of salient aspects of the source code generated by the automatic code generator utilizing user-specified parameter values.

30. The electronic device of claim 29, further comprising:

a display device configured to display a view of salient aspects of the adjusted source code in the view of salient aspects of the source code.

* * * * *

UNITED STATES PATENT AND TRADEMARK OFFICE
CERTIFICATE OF CORRECTION

PATENT NO. : 8,504,983 B1  
APPLICATION NO. : 12/706572  
DATED : August 6, 2013  
INVENTOR(S) : Matthew Englehart et al.

It is certified that error appears in the above-identified patent and that said Letters Patent is hereby corrected as shown below:

On the Title Page, item (56)

Page 2, second column, line 8, in the "The MathWorks, Inc." reference, change "Workshopa" to --Workshop--

Page 2, second column, line 9, in the "The MathWorks, Inc." reference, delete "A" before "Users"

Signed and Sealed this  
Thirty-first Day of December, 2013

Margaret A. Focarino  
*Commissioner for Patents of the United States Patent and Trademark Office*